United States Patent
Jeong

(10) Patent No.: US 7,738,929 B2
(45) Date of Patent: Jun. 15, 2010

(54) MOBILE TERMINAL HAVING A BUFFER

(75) Inventor: June-Wook Jeong, Incheon (KR)

(73) Assignee: LG Electronics Inc., Seoul (KR)

( * ) Notice: Subject to any disclaimer, the term of this patent is extended or adjusted under 35 U.S.C. 154(b) by 686 days.

(21) Appl. No.: 11/649,852

(22) Filed: Jan. 5, 2007

(65) Prior Publication Data

US 2008/0119245 A1 May 22, 2008

(30) Foreign Application Priority Data

Nov. 17, 2006 (KR) ...................... 10-2006-0114149

(51) Int. Cl.
*H04M 1/02* (2006.01)
(52) U.S. Cl. .................... 455/575.1; 455/575.4
(58) Field of Classification Search .............. 455/550.1, 455/575.1, 575.3, 575.4, 90.1, 90.2, 90.3, 455/347, 351
See application file for complete search history.

(56) References Cited

U.S. PATENT DOCUMENTS

| 2002/0167787 A1 | 11/2002 | Kitamura et al. |
| 2005/0003870 A1 | 1/2005 | Nakano et al. |
| 2006/0207865 A1 | 9/2006 | Ma et al. |
| 2007/0232243 A1* | 10/2007 | Chen .......................... 455/90.3 |

FOREIGN PATENT DOCUMENTS

| DE | 94 14 086.3 U1 | 11/1994 |
| DE | 198 19 287 A1 | 11/1998 |
| DE | 692 25 933 T2 | 2/1999 |
| DE | 199 06 386 A1 | 8/2000 |
| DE | 199 41 960 A1 | 3/2001 |
| DE | 601 16 579 T2 | 12/2006 |
| EP | 0 531 829 B1 | 3/1993 |
| EP | 1 206 101 B1 | 5/2002 |
| JP | 10-28157 A | 1/1998 |
| JP | 2003-337650 A | 11/2003 |
| JP | 2004-38308 A | 2/2004 |
| JP | 2005-124232 A | 5/2005 |
| RU | 32636 U1 | 9/2003 |
| WO | WO-03/103157 A2 | 12/2003 |

* cited by examiner

*Primary Examiner*—Thanh C Le
(74) *Attorney, Agent, or Firm*—Birch, Stewart, Kolasch & Birch, LLP

(57) ABSTRACT

A mobile terminal including a body having an exterior surface, an input device, at least a portion of the input device extending above the exterior surface, and a buffer protecting the input device from external impact. The buffer may be connected to a circuitry supporting substrate in the mobile terminal, a cover of the mobile terminal, or be formed as the cover of the mobile terminal.

12 Claims, 5 Drawing Sheets

MOBILE TERMINAL HAVING A BUFFER

CROSS REFERENCE TO RELATED APPLICATIONS

This application claims the benefit of Korean Patent Application No. 10-2006-0114149, filed Nov. 17, 2006, and is herein incorporated by reference.

BACKGROUND OF THE INVENTION

1. Field of the Invention

The present invention is directed generally to mobile terminals, and more particularly to mobile terminal having a buffer to protect an input device from an external impact.

2. Description of Related Art

In general, a mobile terminal means a cellular phone, a PDA (Personal Digital Assistant), and the like, which a user can carry with himself/herself to send/receive various kinds of information, such as images, voices, and text massages via wireless communication or to receive various services via connection to a predetermined server.

That form of the mobile terminal, especially a cellular phone, has evolved from an initial bar type into a flip type, folder type, and a slide member type according to consumer demand and technical development.

Because a mobile terminal performs a wireless communication function in addition to various other functions in correspondence with a user's demand, such as play music, videos, and take pictures, the mobile terminal often includes an input device that is configured to control one or more functions of the mobile terminal. In particular, the input device may be a wheeled structure or lever mechanism that allows the user to scroll and select options.

Because the user must manipulate the input device, it generally extends above an exterior surface of the mobile terminal. As such, the input device is exposed to shock or impact force and can be damaged if a shock or impact occurs. In addition, the shock or impact force may also be transmitted through the input device to underlying components, thereby causing further damage to the mobile terminal.

BRIEF SUMMARY OF THE INVENTION

One exemplary feature of the present invention is to provide a mobile terminal that includes a buffer to absorb shock or impact force to protect the input device and underlying components.

According to principles of this invention, a mobile terminal is provided that includes a body having an exterior surface, an input device, at least a portion of the input device extending above the exterior surface, and a buffer protecting the input device from external impact.

In another aspect, the buffer may include a body portion having a hole therein, at least one linkage arm extending from a side of the body portion, the linkage arm having a fixing hole formed therein, the fixing hole being configured to allow the buffer to be connected to a circuitry supporting substrate of the mobile terminal, and a pressure portion configured to contact a portion of the input device of the mobile terminal. The buffer may include a pair of projection portions that extend through the exterior surface of the body of the mobile terminal. The projection portions may extend a greater distance from the exterior surface than the input device extends from the exterior surface. Each of the projection portions may be located at a corresponding end of the input device.

In a different aspect, the buffer may include a body portion having a hole therein, at least one linkage arm extending from a side of the body portion, the linkage arm having a fixing hole formed therein, the fixing hole being configured to allow the buffer to be connected to a cover formed on the body of the mobile terminal, and a pressure portion configured to contact a portion of the input device of the mobile terminal. Additional features of the buffer are similar to those described above.

In still another aspect, the buffer may include a body portion having a hole formed therein, the body portion being configured to be a cover portion of the mobile terminal, and a pair of projection portions extending from the body portion. Additional features of the buffer are similar to those described above.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the exemplary embodiments of the present invention, examples of which are illustrated in the accompanying drawings. Hereinafter, mobile terminals according to the present invention will be explained in more detail. In addition, while the present invention is explained by reference to a slide type mobile terminal, it is equally suitable for other mobile terminals including bar type, swivel type, and fold type mobile terminals.

Figure 1:
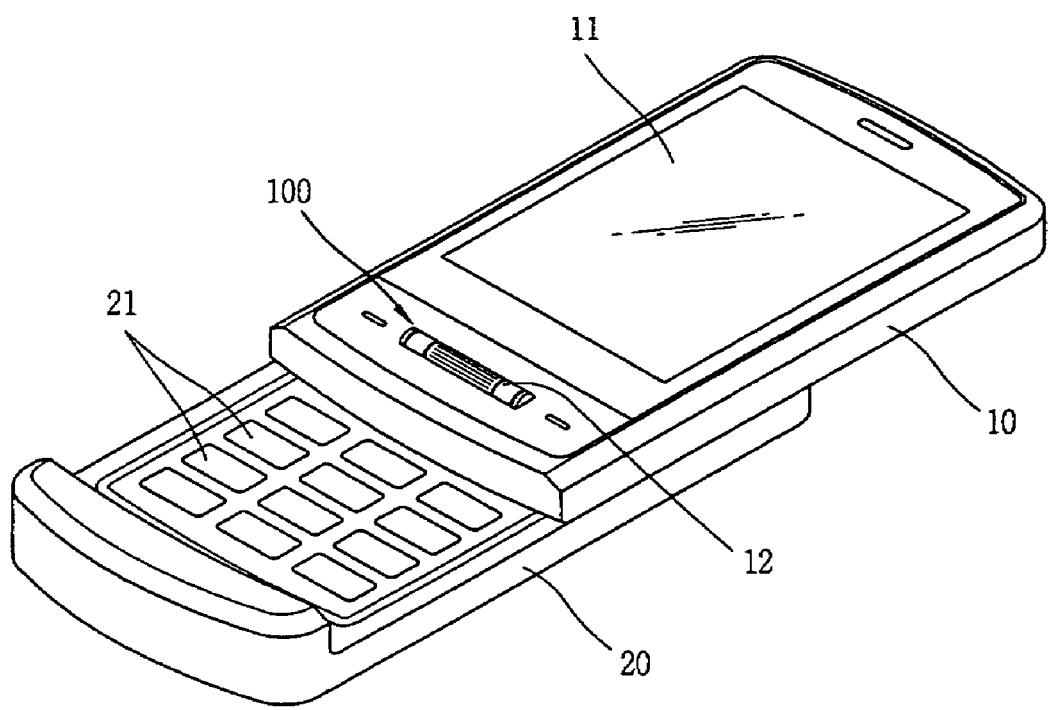
FIG. 1 is a perspective view of a mobile terminal according to an exemplary embodiment of the present invention.

As shown in FIG. 1, the mobile terminal includes a first body 20 and a second body 10 that is slidably displaced on the first body 20. A keypad 21 is formed in the first body, which is exposed when the second body 10 is slid into an open position. The keypad 21 is capable of entering characters or other commands useable by the mobile terminal.

The second body 10 includes a display module 11 configured to display information relevant to one or more functions of the mobile terminal. In addition to control signals provided by keypad 21, an input device 12 can be formed in the second body 10. As shown in FIG. 1, the input device extends beyond the exterior of the second body 20 and is susceptible to damage by an impact or improper activation.

Therefore, as best seen in FIG. 2, a shock preventing device or buffer 100 is provided to protect the input device 12 from shock or other external forces. The buffer 100 is located in the interior of the second body 10 between the input device 12 and the second body 10.

The second body 10 includes an upper part 10a and a lower part 10b. A display window 11a of the display module 11 is formed in the upper part 10a while the display 11b may be disposed on the lower part 10b. A circuitry supporting substrate 14 may also be disposed in the lower part 10b. A plurality of dome switches 14a may be formed on the circuitry supporting substrate 14 and arranged to be located under portions of the input device 12 to be activated when the input device 12 is pressed. A plurality of mounting holes 15 is provided to connect the buffer 100 to the lower body part 10b via the circuitry supporting substrate 14.

As noted above, the input device 12 is arranged above the plurality of switches 14a and extends through a mounting hole 13 is provided in the upper part 10a. The input device includes a roller member 12b that allows a user to scroll through menu options or otherwise move a cursor shown on display 11b. In addition, the roller member 12b is displaceable to engage one of the plurality of switches 14a located under the roller member 12b. Buttons 12a are also displaceable to engage corresponding switches 14a located under the respective buttons 12a.

Figure 2A:
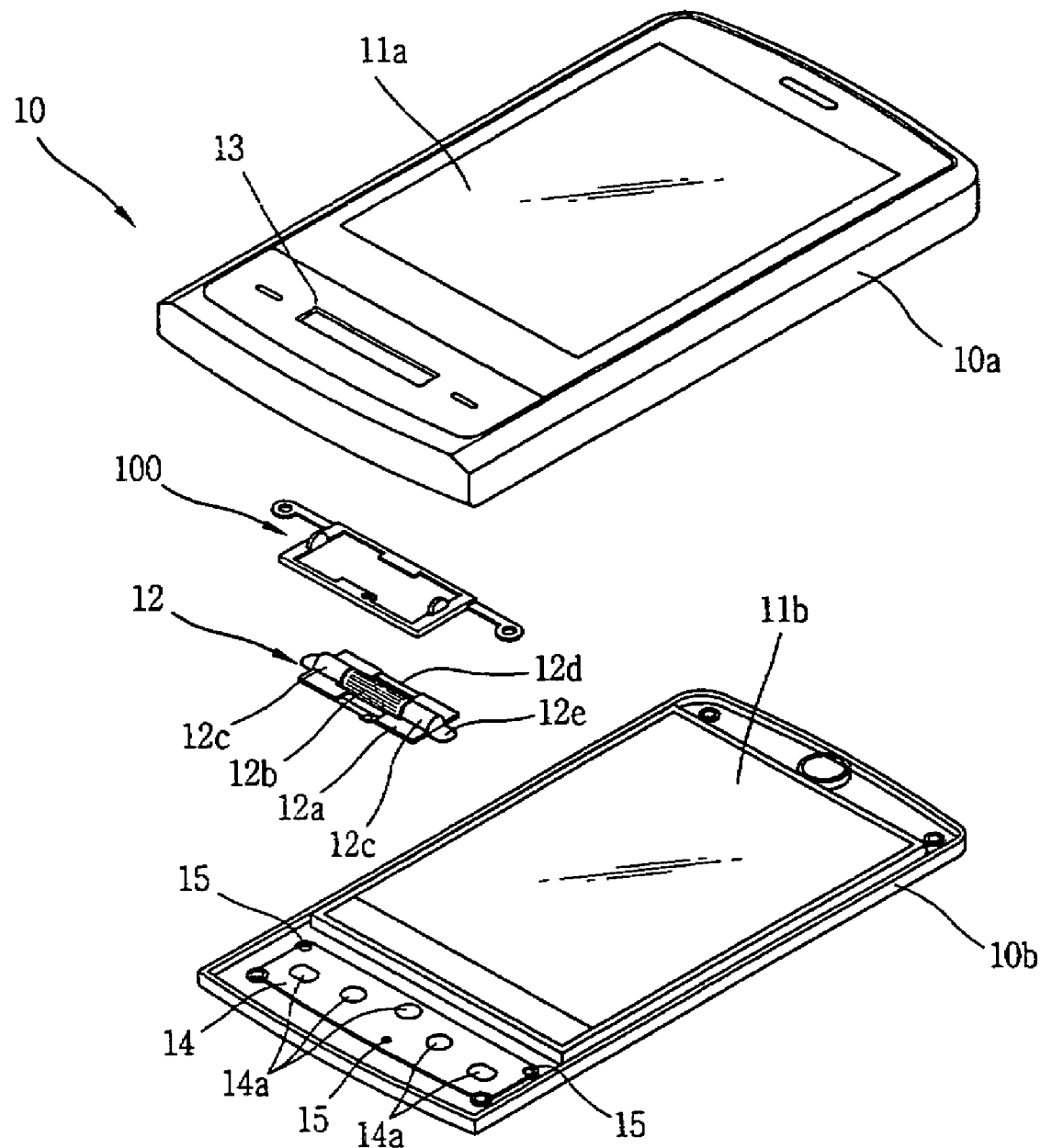
FIG. 2A is an exploded perspective view of the mobile terminal of FIG. 1, FIGS. 2B and 2C are perspective views of a buffer and a input device, respectively, shown in FIG. 2A.
Figure 2B:
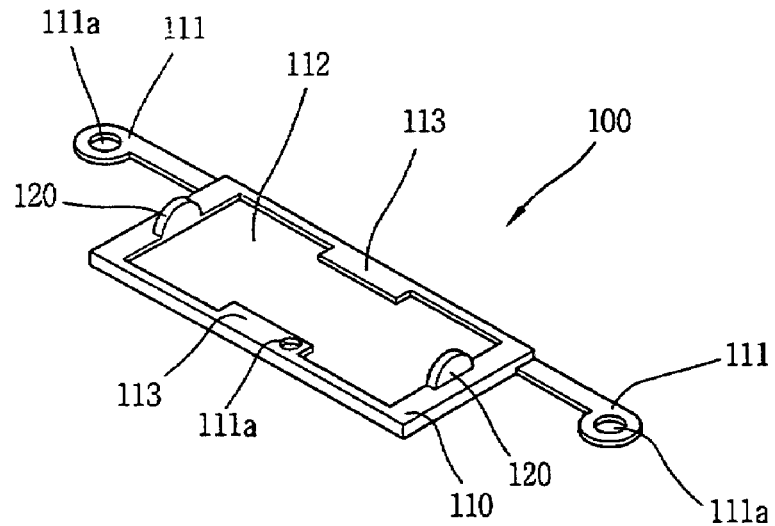

As shown in FIG. 2B, the buffer 100 includes a body portion 110 defining a through hole 112 configured to receive the input device 12 therein. Specifically, the roller member 12b and buttons 12a extend a least partially through the through hole 112. A pair of pressure portions 113 are arranged to overlay the input device 12.

The buffer includes a pair of linkage arms 111 that extend from the body portion 110. While two linkage arms 111 are shown, it is understood that one or more linkage arms 111 may be provided. In addition, fixing holes 111a are provided in the buffer 100 and correspond to the mounting holes 15 described above.

A pair of projection portions 120 is formed on the body portion 100 and extends upwards from the body portion 110 such that when the buffer 100 is assembled with the input device 12 in the second body 10, the projection portions extend through mounting hole 13.

Figure 2C:
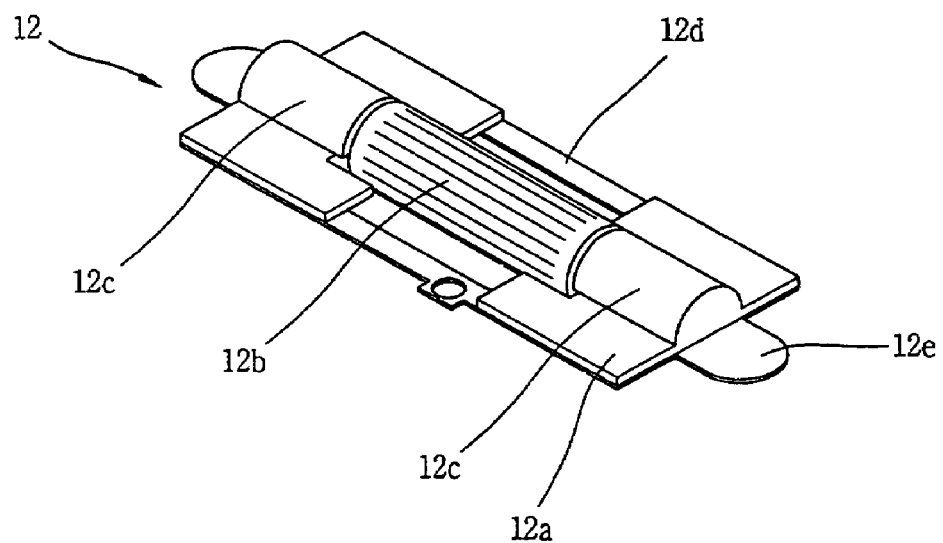

As shown in FIG. 2C, each of the buttons 12a includes a flat portion configured to engage the switches 14a and a support portion 12c configured to support an end of the roller member 12b therein. An extension 12e is configured to be arranged below and contact the buffer 100. In addition, the input device includes a base 12d that assists in holding the input device 12 together. The base 12d also supports the pressure portions 113 of the buffer 100.

Figure 3:
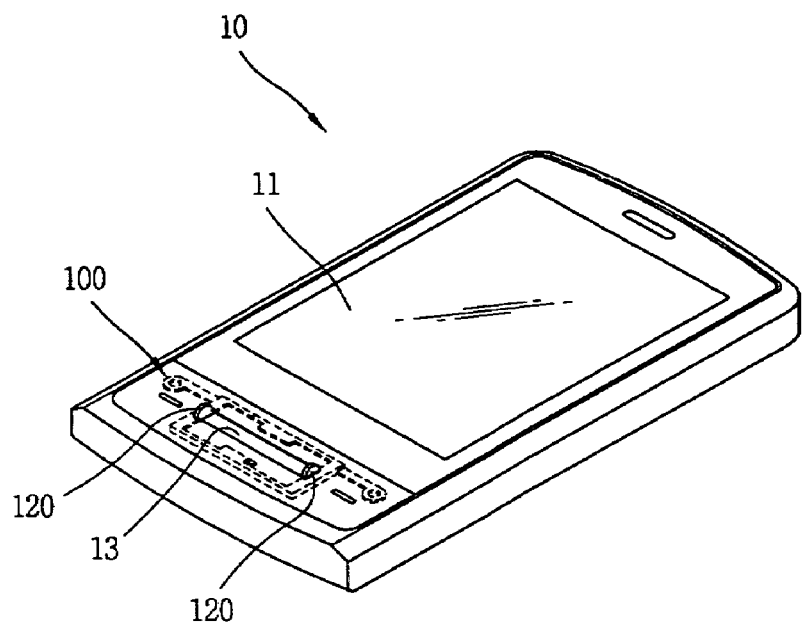
FIG. 3 is a schematic showing the buffer installed in the mobile terminal of FIG. 1.
Figure 4:
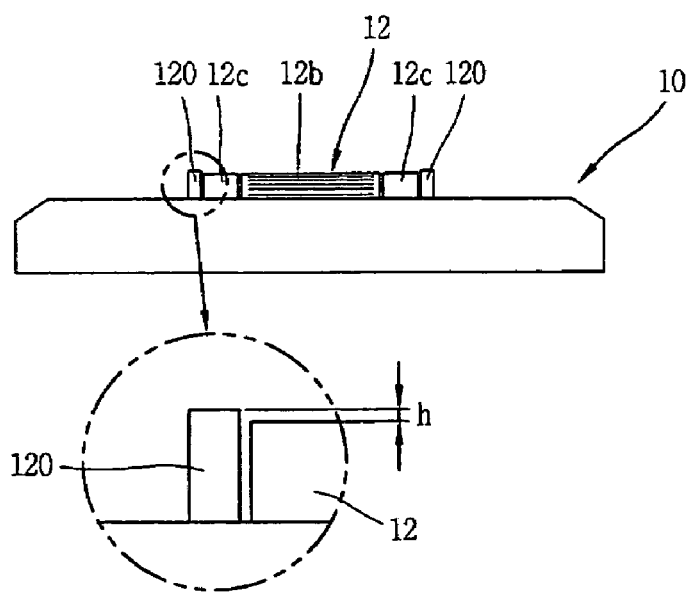
FIG. 4 is an elevation view of the mobile terminal of FIG. 1.

As shown in FIGS. 2A, 3, and 4, the buffer 100 is mounted to the circuitry supporting substrate 14 such that the input device 12 is held between the buffer 100 and the circuitry supporting substrate. With particular reference to FIG. 4, both the projection portions 120 and the input device 12 extend above the exterior surface of the second body 10. The projection portions 120 extend a distance (h) greater than input device 12. As a result, the projection portions 120 can absorb a shock or impact without the shock being transmitted to the input device 12.

For example, if the mobile terminal were turned over on a surface, the projection portions 120 would provide a clearance equivalent to the distance (h) between the surface and the input device 12. In this manner, no impact force would be provided directly to the input device 12 and consequently, no impact force would be transferred to the switches 14a arranged below the input device 12. Rather, the impact force would be transferred to the linkage arms 111 and the pressure portions 113.

While the projection portions 120, in conjunction with the pressure portion 113 and linkage arms 111 distribute an impact force, the buffer 100 does not interfere with normal operation of the input device. In other words, the input device 12 remains displaceable towards the switches 14 as a result of a user pressing on the input device with a finger.

Figure 5:
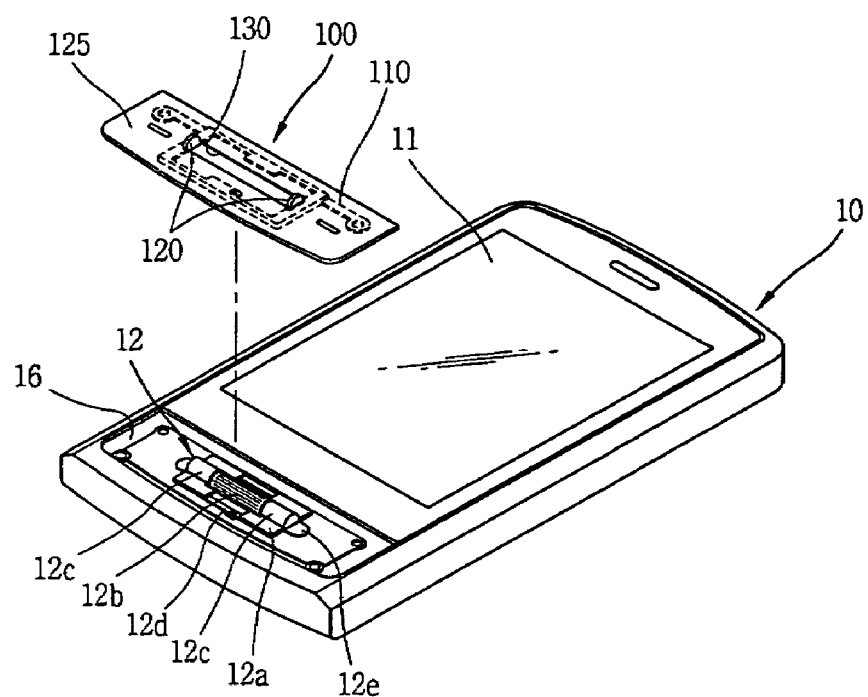
FIG. 5 is a second exemplary embodiment of the buffer installed in the mobile terminal of FIG. 1.

In a second exemplary embodiment, as shown in FIG. 5, the buffer 100 is mounted to a cover 125 of the second body 10 as opposed to the circuitry supporting substrate 14. The cover 125 includes a through hole 130 through which the input device 12 can extend. In all other respects the buffer 100 is the same as described above. Because the buffer 100 is not mounted directly to the circuitry supporting substrate, the input device may be better seated beneath the buffer 100.

Figure 6:
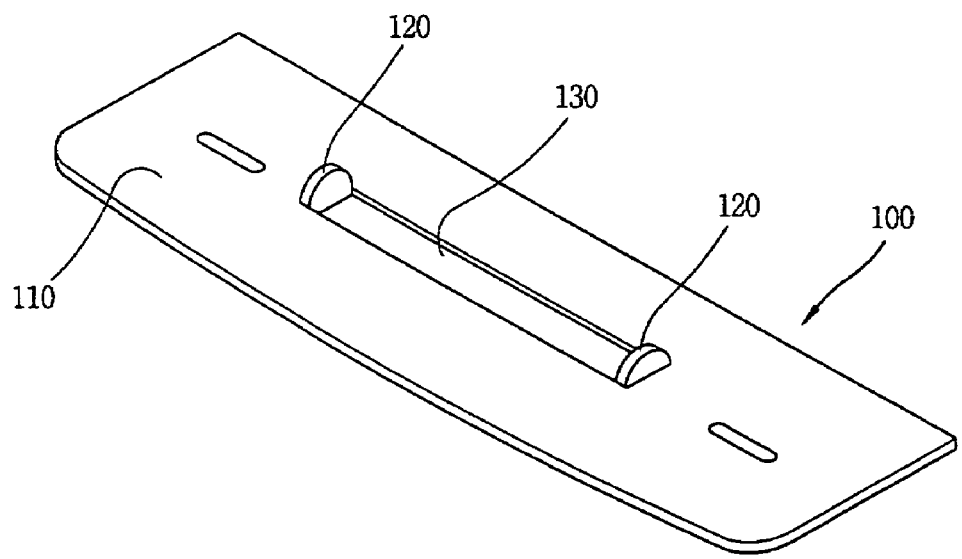
FIG. 6 is a third exemplary embodiment of a buffer of the present invention.

In a third exemplary embodiment, as shown in FIG. 6, the buffer 100 has been combined with the cover so that the buffer body 110 forms the cover. In all other respects, the buffer 100 functions similarly to that described above.

With respect to the various embodiments described above, the mobile terminal is provided with a buffer that protects the input device from undesirable contact, such as a shock or impact force. In addition, the switches are protected because buffer transfers the shock or impact force to other structures of the mobile terminal.

The invention thus being described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A mobile terminal comprising:
   a body having an exterior surface;
   an input device, at least a portion of the input device extending above the exterior surface; and
   a buffer protecting the input device from external impact, the buffer including:
   a body portion having a hole therein;
   at least one linkage arm extending from a side of the body portion, the linkage arm having a fixing hole formed therein, the fixing hole being configured to allow the buffer to be connected to a circuitry supporting substrate of the mobile terminal; and
   a pressure portion configured to contact a portion of the input device of the mobile terminal.

2. The mobile terminal according to claim 1, wherein the buffer further includes a pair of projection portions that extend though the exterior surface of the body of the mobile terminal.

3. The mobile terminal according to claim 2, wherein the projection portions extends a greater distance from the exterior surface than the input device extends from the exterior surface.

4. The mobile terminal according to claim 3, wherein each of the projection portions is located at a corresponding end of the input device.

5. A mobile terminal comprising:
   a body having an exterior surface;
   an input device, at least a portion of the input device extending above the exterior surface; and
   a buffer protecting the input device from external impact, wherein the buffer includes:

a body portion having a hole therein;

at least one linkage arm extending from a side of the body portion, the linkage arm having a fixing hole formed therein, the fixing hole being configured to allow the buffer to be connected to a cover formed on the body of the mobile terminal; and a pressure portion configured to contact a portion of the input device of the mobile terminal.

6. The mobile terminal according to claim 5, wherein the buffer further includes a pair of projection portions that extend through the exterior surface of the body of the mobile terminal.

7. The mobile terminal according to claim 6, wherein the projection portions extend a greater distance from the exterior surface than the input device extends from the exterior surface.

8. The mobile terminal according to claim 3, wherein each of the projection portions is located at a corresponding end of the input device.

9. The mobile terminal according to claim 1, wherein the buffer includes a body portion having a hole formed therein, the body portion being configured to be a cover portion of the mobile terminal, and a pair of projection portions extending from the body portion.

10. The mobile terminal according to claim 9, wherein the projection portions extends a greater distance from the exterior surface than the input device extends from the exterior surface.

11. The mobile terminal according to claim 10, wherein each of the projection portions is located at a corresponding end of the input device.

12. A mobile terminal comprising:

a body having an exterior surface;

an input device, at least a portion of the input device extending above the exterior surface; and a buffer protecting the input device from external impact; and a plurality of switches located beneath the input device, the buffer protecting the plurality of switches from external impact.

* * * * *